G. M. EATON.
ELECTRIC LOCOMOTIVE.
APPLICATION FILED JAN. 7, 1911.
1,206,314.
Patented Nov. 28, 1916.
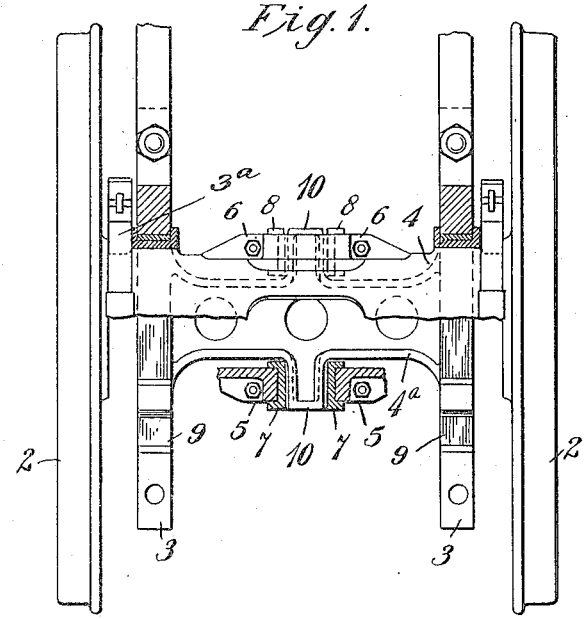
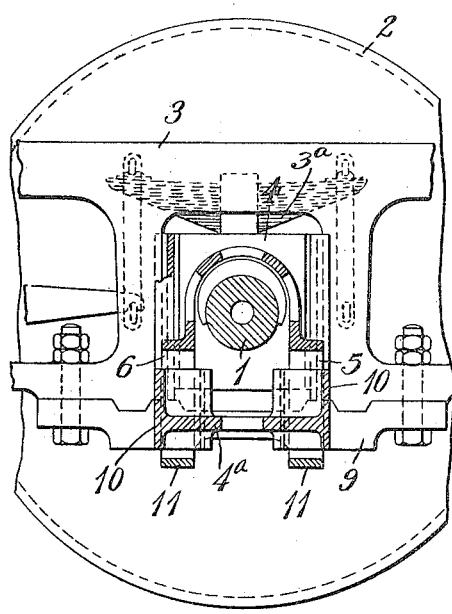
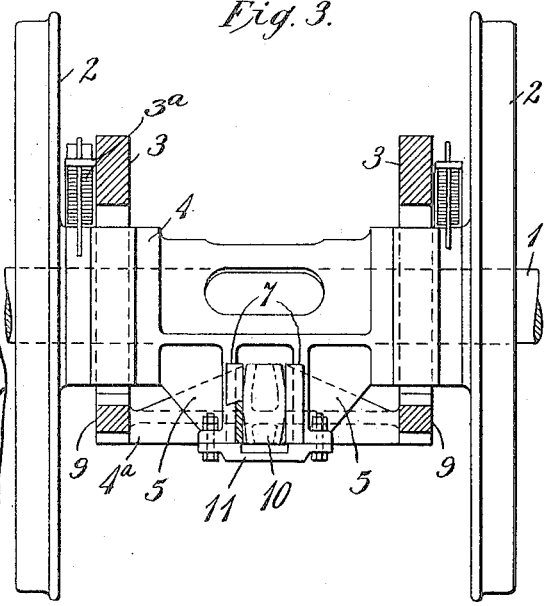
WITNESSES:
Fred H. Miller
R. J. Earbory
INVENTOR
George M. Eaton
BY
Wesley G. Carr
ATTORNEY

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,206,314.     Specification of Letters Patent.     Patented Nov. 28, 1916.

Application filed January 7, 1911. Serial No. 601,320.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Locomotives, of which the following is a specification.

My invention relates to electric locomotives and other vehicles which are propelled by electric motors and it has special reference to such vehicles as are adapted to haul heavy loads at very high speeds.

The object of my invention is to provide a simple and durable journal box or bearing structure for electric locomotives and other railway vehicles which shall be laterally restrained at relatively low points and therefore specially adapted to reduce the flange pressure usually developed by locomotives having relatively low centers of gravity. Electric locomotives have usually had relatively low centers of gravity, by reason of the fact that the electric driving motors were located on or near the axles. When a locomotive of this structure was in operation, the various movements of its body and frame produced heavy strains in the rails and wheel flanges, which would have been absorbed by the carrying springs of the locomotive if its center of gravity had been relatively high.

In a co-pending application for Letters Patent of John E. Webster, Serial No. 567,908, filed June 20, 1910, means is set forth for obtaining somewhat lower points of side restraint for the spring-borne parts of locomotives, by utilizing specially constructed guide ways for the locomotive journal boxes.

According to my present invention, instead of restraining the journal boxes of a locomotive in the usual manner against lateral movement, I restrain each pair of journal boxes from a single point located in the central plane of the locomotive and materially below the locomotive axle with which they are associated, whereby the easy-riding qualities of a locomotive having a high center of gravity are secured.

My invention is illustrated in the accompanying drawings of which—

Figure 1 is a partially sectional plan view of a pair of locomotive bearings and a portion of a locomotive frame constructed in accordance therewith. Figs. 2 and 3 are sectional elevations at right angles to each other of the parts shown in Fig. 1.

Referring to the drawings, the structure here shown comprises a locomotive axle 1, driving wheels 2 secured thereto, side frames 3, a single journal box casting 4, an equalized side-spring system $3^a$, and a pedestal binder casting $4^a$. In accordance with familiar practice, the side-frames 3, and any other so-called spring-borne parts that may be carried thereby, are resiliently supported upon the axle 1 by means of an equalized side-spring system $3^a$ of suitable form.

The casting 4 embodies the axle journal boxes and is provided with downwardly extending notched projections or jaws 5 and 6, which are located on opposite sides of the central vertical plane of the axle and are provided with shoes 7 and 8.

The pedestal binder casting $4^a$ is provided with end members or binders 9 which are bolted to the side frames 3 in the usual manner and a connecting body member, having laterally extending lugs or projections 10 that are slightly tapered toward their upper and lower ends to permit of the usual rolling or rocking movements of the spring-borne parts with respect to the axles and journal boxes. The lugs 10 project into notches in the jaws 5 and 6 and engage the shoes 7 and 8.

The shoes are held in place by means of small binders 11 which are bolted to the jaws 5 and 6. The journal boxes are restrained against lateral movement with respect to the side frames by the engagement of the projections 10 with the jaws 5 and 6, which also serve as a pivot about which the side frames 3 may roll.

By the use of my invention the vertical distance between the center of gravity and the point of side restraint for the spring-borne parts is materially increased. The lateral movements of the locomotive body are therefore largely converted into rolling movements which are absorbed by the usual side springs (not shown) of the locomotive, thereby reducing the excessive side thrust on the wheel flanges.

The side restraining members do not necessarily form parts of the pedestal binder and may be permanently connected to the locomotive frame within the spirit and scope of my invention.

The parts which coöperate to effect the side restraint may be located only on one side, instead of on both sides of the locomotive axle as shown in the drawings.

I claim as my invention:

1. A railway vehicle comprising a wheel axle, journals and journal boxes therefor and a frame, said journal boxes being united and embodying means located in the central longitudinal plane of the locomotive and materially below the axle centers for preventing relative lateral movement of said frame and said boxes.

2. A railway vehicle comprising wheel axles, journals and journal boxes, a body frame supported on said journals and provided with jaw projections in the central longitudinal plane of the locomotive, said journal boxes being united and embodying projections located one on each side of the central vertical plane of the axle adapted to engage the jaw projections of the frame materially below the center of the wheel axles.

3. In a railway vehicle, the combination with side frames having U-shaped pedestals and wheel axles, of journal boxes united in pairs to form a single structure for each axle, of means secured to the side frames and coöperating with the journal structure for preventing relative lateral movement of said frames and said journal structure.

4. In a railway vehicle, the combination with side frames having U-shaped pedestals and wheel axles, of journal boxes united in pairs to form a single structure for each axle, and a pedestal binder structure coöperating with the journal structure in the central longitudinal plane of the locomotive for laterally restraining the frames.

5. In a railway vehicle, the combination with side frames having U-shaped pedestals and wheel axles, of journal boxes united in pairs to form a single structure for each axle, of a pedestal binder structure extending laterally of the locomotive, secured to the side frames and provided with laterally extending projections in the central longitudinal plane of the locomotive, said journal structure being provided with coöperating jaw projections for laterally restraining the locomotive frame.

6. In an electric vehicle, the combination with side frames, wheel axles, journals and journal boxes for the axles on which the side frames are supported, said journal boxes being united in pairs to form a single structure for each axle having downwardly extending jaw projections located on opposite sides of the axle and in the central longitudinal plane of the locomotive, of a single pedestal binder structure for each axle extending laterally of the locomotive secured to the side frames and provided with laterally extending projections adapted to coöperate with the jaw projections of the journal structure.

7. A railway vehicle comprising a wheel axle, journal boxes therefor and a frame, said journal boxes being joined and provided with means located between the journals and materially below the axle center for preventing relative lateral movement of said frame and said boxes.

8. A railway vehicle comprising a wheel axle, journals therefor and a frame, said journals being united and embodying means located in a longitudinal plane of the vehicle materially below the axle center and in the vertical plane of the axle center for positively restraining said frame against lateral movement on the frame.

9. A railway vehicle comprising a wheel axle, journals therefor and a frame, said journals being united and embodying means located in a longitudinal plane of the vehicle materially below the axle center and acting laterally of the locomotive and parallel to the axial center preventing lateral movement of the frame relative to said journals.

10. A railway vehicle comprising a wheel axle, journals therefor and a frame, said journals being joined and provided with means located in the central longitudinal plane of the locomotive and acting at right angles to said central plane for positively restraining the frame against lateral movement.

11. In a vehicle, the combination with a frame and journal boxes coöperating therewith, of means disposed materially below the boxes for preventing relative lateral movement of said frame and said boxes.

12. In a vehicle, the combination with a spring-borne part and journal boxes for supporting said part, of means disposed materially below said boxes for positively restraining the side-thrust of the spring-borne part.

13. In a vehicle, the combination with a body frame and journal boxes coöperating therewith and capable of vertical and lateral movement with respect thereto, of means coöperating with said frame and said boxes, and disposed below said boxes for preventing relative lateral movement and for permitting relative vertical movement between said boxes and said frame.

14. In a vehicle, the combination with a body frame having vertically disposed pedestals, journal boxes disposed therein, and adapted for lateral and vertical movement, said boxes constituting a unitary structure, and an auxiliary vertically disposed pedestal associated with said structure and projecting below said boxes, of means rigidly associated with said frame and coöperating with said auxiliary pedestal for preventing relative lateral movement and for permitting relative vertical movement of said frame and said boxes.

15. In a vehicle, the combination with wheels, an axle therefor and a frame coöperating therewith, of means for providing for rotative movement of said frame relative to said wheels and for preventing lateral movement relative thereto, said means comprising a longitudinal axis disposed below said wheel axle.

16. In a vehicle, the combination with wheels, an axle therefor and a frame coöperating therewith, of means disposed intermediate said wheels and directly below said axle and coöperating with said frame for permitting said frame to roll laterally.

17. In a vehicle, the combination with wheels, an axle therefor and a frame coöperating therewith, of means coöperating with said wheels, axle and said frame for permitting said frame to roll laterally about a point in the central frame of the vehicle and below its actual center of gravity and for preventing lateral translation thereof relative to the wheels.

18. In a vehicle, the combination with a frame and wheels associated therewith, of means disposed directly below the axes of said wheels for pivoting said frame about a longitudinal axis.

19. In a vehicle, the combination with a frame and wheels coöperating therewith, of means for providing for rotative movement of said frame relative to said wheels and for preventing lateral movement relative thereto, said means being disposed between and below the axes of said wheels.

20. In a vehicle, the combination with a frame and wheels associated therewith, of means for providing for rotative movement of said frame relative to said wheels and for preventing lateral movement relative thereto, said means being disposed below the axes of said wheels and substantially midway between them.

21. In a vehicle, the combination with a frame and wheels associated therewith, of means disposed below the axes of said wheels for permitting said frame to roll about a longitudinal axis below its center of gravity and for preventing it from having a movement of lateral translation relative to the wheels.

22. In a vehicle, the combination with wheels, an axle and a movable spring-borne part associated with said axle and wheels, and having a relatively high center of gravity, of means coöperating with said spring-borne part for causing it to roll laterally about an axis below its center of gravity and for preventing lateral translation thereof relative to the wheels.

23. In a vehicle, the combination with wheels, an axle and a movable spring-borne part associated with said axle and wheels, and having a relative high center of gravity, of means coöperating with said spring-borne part for causing it to roll laterally about an axis substantially mid-way between said wheels and directly below the said axle.

24. In a vehicle, the combination with a frame and wheels associated therewith, of means disposed materially below the axes of said wheels for preventing relative lateral movement between said frame and said wheels.

25. In a vehicle, the combination with a frame and wheels coöperating therewith, of means disposed in the central longitudinal plane of the vehicle and below the axes of said wheels for preventing relative lateral movement between said frame and said wheels.

26. In a vehicle, the combination with a frame and wheels associated therewith, of means disposed between said wheels and below the axes thereof for preventing relative lateral movement between said frame and said wheels.

27. In a vehicle, the combination with a frame and wheels associated therewith, of means disposed substantially mid-way between the wheels and materially below the axes thereof for preventing relative lateral movement between said frame and said wheels.

28. In a locomotive, the combination with an axle, a unitary journal box extending the entire length of the axle, laterally disposed pairs of downwardly-projecting jaws integrally associated with the opposite sides of said journal box and located in the central longitudinal plane of the locomotive, side-frames having pedestal openings to receive said journal box and adapted for relative movement with respect thereto, and an equalized side-frame system for resiliently supporting said side-frames upon said journal box, of a single unitary pedestal binder extending laterally between the side-frames and directly beneath said journal box, and a pair of oppositely projecting longitudinally-extending members integrally associated with said binder and disposed between and adapted to engage the respective pairs of journal box jaws, whereby said side-frames and said journal box are restrained against relative lateral movement.

29. In a vehicle, the combination with a frame and wheels coöperating therewith, of means disposed between and below the axes of said wheels for providing a connection with said frame whereby it may simultaneously have a rotative movement and a movement of translation relative to said wheels.

30. In a vehicle, the combination with a frame and wheels coöperating therewith, of means disposed below the axis of said wheels for permitting said frame to have a limited vertical movement of translation and a rotative movement about a longitudinal axis below its center of gravity.

In testimony whereof, I have hereunto subscribed my name this 29th day of Dec. 1910.

GEORGE M. EATON.

Witnesses:
G. H. F. HOLZ,
B. B. HINES.

Copies of this patent may be obtained for five cents each, by addressing the "Commissioner of Patents, Washington, D. C."